United States Patent
Moake

(10) Patent No.: US 11,610,288 B2
(45) Date of Patent: Mar. 21, 2023

(54) SHARPENING DATA REPRESENTATIONS OF SUBTERRANEAN FORMATIONS

(71) Applicant: Halliburton Energy Services, Inc., Houston, TX (US)

(72) Inventor: Gordon Layne Moake, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 678 days.

(21) Appl. No.: 16/680,240

(22) Filed: Nov. 11, 2019

(65) Prior Publication Data
US 2021/0142449 A1 May 13, 2021

(51) Int. Cl.
| | |
|---|---|
| G06T 5/00 | (2006.01) |
| E21B 49/00 | (2006.01) |
| E21B 47/002 | (2012.01) |
| G01V 11/00 | (2006.01) |
| G01V 1/40 | (2006.01) |
| G01V 3/38 | (2006.01) |
| G01V 5/04 | (2006.01) |

(52) U.S. Cl.
CPC ............ *G06T 5/003* (2013.01); *E21B 47/002* (2020.05); *E21B 47/0025* (2020.05); *E21B 49/00* (2013.01); *G01V 1/40* (2013.01); *G01V 3/38* (2013.01); *G01V 5/04* (2013.01); *G01V 11/002* (2013.01)

(58) Field of Classification Search
CPC ............ G05B 23/0221; G05B 2223/06; G06N 20/00; G07C 5/0816; G07C 5/008; G01P 13/00; H04W 4/46; H04W 76/15; H04W 84/18
See application file for complete search history.

(56) References Cited

U.S. PATENT DOCUMENTS

| | | |
|---|---|---|
| 5,924,499 A | 7/1999 | Birchak et al. |
| 7,027,926 B2 | 4/2006 | Haugland |
| 7,403,857 B2 | 7/2008 | Haugland |
| | (Continued) | |

OTHER PUBLICATIONS

Jacobson, et al.; "Resolution Enhancement of Nuclear Measurements through Deconvolution"; The Log Analyst; Nov.-Dec. 1991; 8 pgs.

*Primary Examiner* — Manuel A Rivera Vargas
(74) *Attorney, Agent, or Firm* — Benjamin Ford; Parker Justiss, P.C.

(57) ABSTRACT

The disclosure presents a process for sharpening an image data representation of collected measurements from a subterranean formation. The sharpening process utilizes an azimuthal filter applied to azimuthal radial ranges around a borehole to designate azimuthal bins. The azimuthal filter utilizes a set of filter coefficients to modify an azimuthal target bin. The set of filter coefficients is a devolution set as it contains at least one positive and one negative filter coefficient. The filter ratio of positive to negative filter coefficients can be adjusted utilizing the statistical uncertainty of the collected measurements and a targeted filter ratio. In some aspects, an axial filter process, also using a binning methodology, can be applied to the collected measurements, where the azimuthal and axial filtered values can be combined for the final image representation. The azimuthal and axial processes can be executed in serial or parallel process flows.

22 Claims, 8 Drawing Sheets

(56) References Cited

U.S. PATENT DOCUMENTS

| | | |
|---|---|---|
| 9,599,737 B2 | 3/2017 | Conrad |
| 2006/0173627 A1* | 8/2006 | Haugland .............. G01V 11/00 |
| | | 702/9 |
| 2009/0030616 A1 | 1/2009 | Sugiura |
| 2011/0161009 A1* | 6/2011 | Wang ....................... G01V 5/04 |
| | | 702/9 |
| 2011/0272570 A1* | 11/2011 | Xu ......................... G01V 5/107 |
| | | 250/269.4 |
| 2014/0229113 A1 | 8/2014 | Yang et al. |
| 2015/0240629 A1 | 8/2015 | Wu et al. |

* cited by examiner

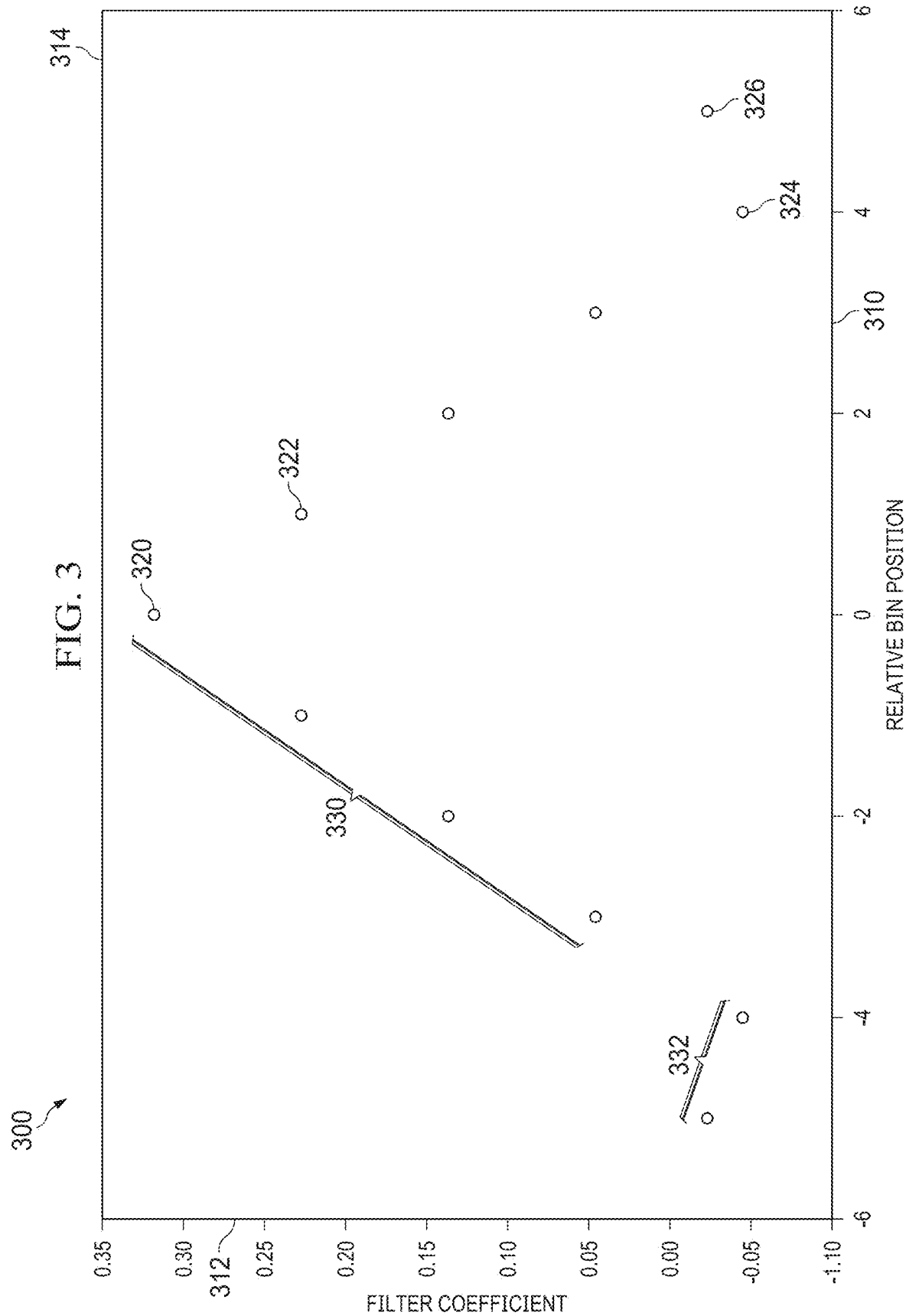

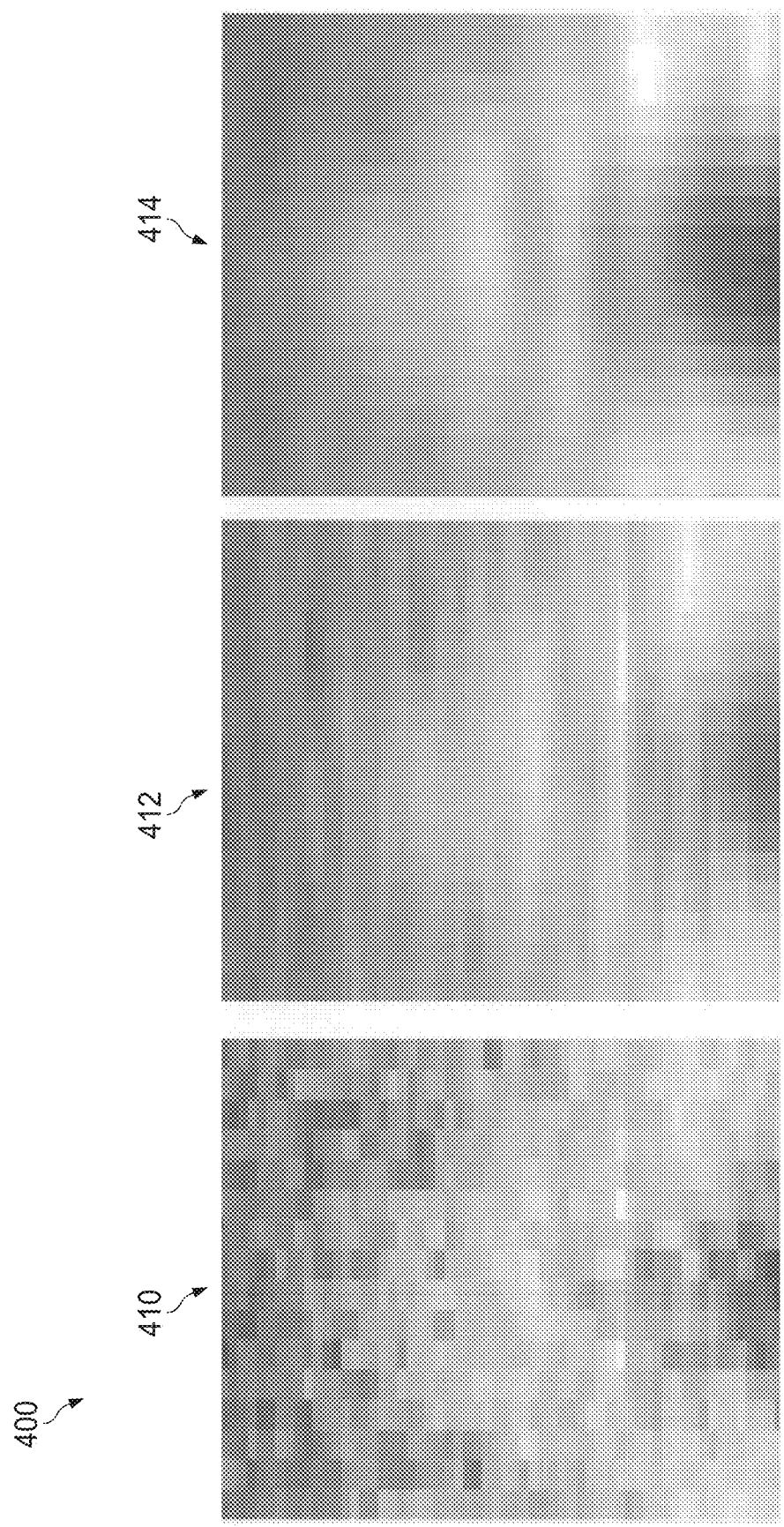

SHARPENING DATA REPRESENTATIONS OF SUBTERRANEAN FORMATIONS

TECHNICAL FIELD

This application is directed, in general, to subterranean formation measurement processing and, more specifically, to applying filters to subterranean formation measurements.

BACKGROUND

In the hydrocarbon drilling industry, it is beneficial to understand characteristics around the borehole. Such characteristics can be used in a various analysis, such as updating a drilling plan. The subterranean formation characteristics can also be used to direct drilling operations such as to keep a borehole within an intended target zone. Furthermore, they can be used to enhance understanding of the reservoir. Various tools can be used to collect measurements of the subterranean formation, where those measurements can be used to calculate values that can be further used to generate data representations, such as images. Well operations personnel can analyze the resulting images and determine appropriate adjustments to drilling or borehole operations. The measurements collected can be subject to interference, drift, reduced precision and other factors that can cause the resulting image to lack a desired level of clarity, making the well operations personnel's analyzation more difficult. A method to improve the clarity and sharpen the resulting image would be beneficial.

SUMMARY

The disclosure provides a method to filter measurements, from a subterranean formation, collected along an axis of a borehole of a well system. In one example, the method includes: (1) partitioning a circumference of the borehole into a set of azimuthal bins, wherein each azimuthal bin represents a range of azimuths at a same axial position, (2) defining a set of azimuthal filter coefficients including at least one positive filter coefficient and at least one negative filter coefficient, (3) allocating the measurements to the set of azimuthal bins using the range of azimuths corresponding with each measurement, (4) selecting an azimuthal target bin and a determined number of neighboring azimuthal bins from the set of azimuthal bins to form an azimuthal subset of bins, (5) computing a filtered value for the azimuthal target bin by multiplying each measurement in the azimuthal subset of bins by a corresponding azimuthal filter coefficient from the set of azimuthal filter coefficients and summing products resulting from the multiplying, and (6) repeating the selecting and the computing for each azimuthal bin in the set of azimuthal bins.

The disclosure also provides a system to filter measurements from a subterranean formation collected along an axis of a borehole of a well system. In one example, the system includes: (1) a downhole tool, operable to collect the measurements, (2) a data filterer, operable to receive the measurements from the downhole tool and generate filtered values by applying one or more filters to the measurements using an azimuthal binning of the measurements, and (3) a controller, operable to receive the filtered values from the data filterer and to utilize the filtered values to sharpen an image derived from the measurements, wherein the data filterer utilizes a set of azimuthal filter coefficients in the applying, and the set of azimuthal filter coefficients includes at least one positive filter coefficient and at least one negative filter coefficient, wherein the controller is one or more of a well site controller and a surface computing system.

The disclosure further provides a computer program product having a series of operating instructions stored on a non-transitory computer-readable medium that directs a data processing apparatus when executed thereby to perform operations to filter measurements, from a subterranean formation, collected along an axis of a borehole of a well system is disclosed. In one example, the computer program product has operations including: (1) partitioning a circumference of the borehole into a set of azimuthal bins, wherein each azimuthal bin represents a range of azimuths, (2) defining a set of azimuthal filter coefficients including at least one positive filter coefficient and at least one negative filter coefficient, (3) allocating the measurements to the set of azimuthal bins using the range of azimuths corresponding with each measurement, (4) selecting an azimuthal target bin and a determined number of neighboring azimuthal bins from the set of azimuthal bins to form an azimuthal subset of bins, (5) computing a filtered value for the azimuthal target bin by multiplying each measurement in the azimuthal subset of bins by a corresponding azimuthal filter coefficient from the set of azimuthal filter coefficients and summing products resulting from the multiplying, and (6) repeating the selecting and the computing for each azimuthal bin in the set of azimuthal bins.

BRIEF DESCRIPTION

Reference is now made to the following descriptions taken in conjunction with the accompanying drawings, in which:

FIG. 3 is an illustration of a diagram of an example filter coefficient chart applied for a selected target bin;

FIG. 4 is an illustration of a diagram of an example image set with multiple filters applied;

DETAILED DESCRIPTION

Figure 1A:
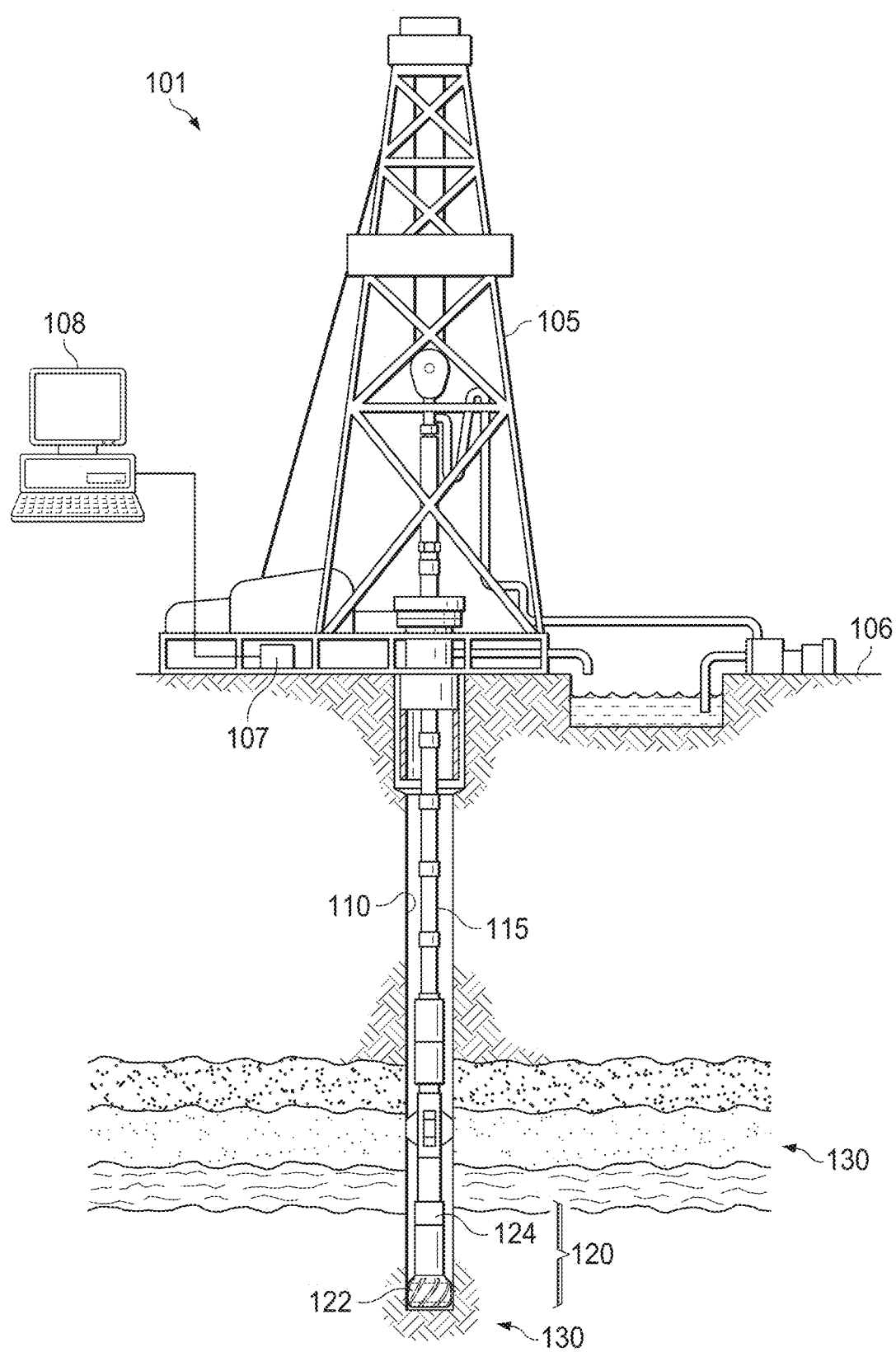
FIG. 1A is an illustration of a diagram of an example drilling system.

When drilling boreholes, such as for hydrocarbon production, scientific exploration, and other purposes, it can be beneficial to understand the characteristics of the subterranean formation through which drilling or measuring operations are occurring. Knowledge of the subterranean formation characteristics, including nearby hydrocarbon reservoirs, can be utilized to direct drilling operations, such as selecting an alternative drill bit, adjusting drilling direction or angle, and other drilling operation concerns. For example, geo-steering can be utilized such as if a desired type of subterranean formation is identified as slanting in a particular direction, then the borehole drilling operation can be adjusted to follow, or avoid, the slanting subterranean formation as desired by the borehole engineers.

A downhole tool can be utilized to collect measurements from the surrounding subterranean formation. For example, the downhole tool can be a density tool, a gamma ray tool, a nuclear measurement tool, an acoustic tool, a resistivity tool, a fiber optic sensor, a distributed acoustic sensor tool (DAS), and other types of downhole measuring tools. Each of these downhole tools can collect measurements of the subterranean formation, for example, count rates and formation properties such as density. These measurements can be used to compute one or more values, e.g., computed parameters, for a particular location of the subterranean formation. Subsequently, the computed measurements can be used to create a data set, such as an image or other data representation, which can be analyzed. A borehole operator or engineer can use the analysis to adjust the drilling operations plan, such as adjusting the drilling angle, direction, or other drilling parameters. They can also use it to identify fractures and compute the angles of dipping beds (dip).

The measurements collected by the various downhole tools can be subject to various factors that can reduce the clarity and accuracy of the measurements. For example, there can be an interference, a frequency drift, a formation with characteristics that reduce the measurement effectiveness, and other factors that reduce the measurement resolution. Transforming the measurements to a resulting image, or other type of representation, can result in a blurriness, e.g., neighboring data points not clearly delineated, proportional to a statistical uncertainty parameter. Reducing the resulting blurriness can sharpen the image, e.g., clarity and improve delineation of neighboring data points.

This disclosure presents a process in which the collected measurements from a subterranean formation can be used to compute values for portions of the subterranean formation, and those computed measurements can be filtered using a deconvolutional process to sharpen the resulting data set, e.g., sharpen an image representation of the data. The sharper image representation can lead to a higher accuracy in determining dips and allow the borehole operator to better understand the borehole and nearby reservoirs and formations. The collected measurements can be filtered using an azimuthal filter and an axial filter where the set of filter coefficients include at least one positive and one negative value.

The process follows two primary steps, a binning step and a filtering step. An azimuthal orientation for the collected measurements is utilized. In some aspects an axial, e.g., longitudinal to the borehole, orientation for the collected measurements can also be utilized. For an azimuthal orientation, for a determined borehole axial position, measurements can be taken azimuthally, around the circumference of the borehole. The azimuth of a measurement is dependent on the type of downhole tool being utilized. For an axial orientation, measurements within the same azimuthal range at differing axial positions is collected and used for the binning and filtering processes. Typically, the differing axial positions are near a uniform distance apart so a resulting image representation can be generated while minimizing additional data uncertainty, though the axial positions do not need to be exactly the same distance apart.

For binning azimuthal oriented collected measurements, the geometric circumference, e.g., the azimuthal positions of the borehole can be apportioned, e.g., divided, into near equal sized azimuth ranges. Each azimuth portion can be allocated an azimuthal bin, such as a storage area to store the computed measurements collected within that azimuth portion. The number of azimuthal bins can be represented by an azimuthal bin count, and can be defaulted to a value, such as sixteen, or specified by an azimuthal bin count. A desired number of bins can increase as the borehole diameter increases. Binning axial oriented collected measurements occurs at each axial position where measurements are collected.

The collected measurements can be used to compute values that are allocated to, e.g., stored in, the respective of the set of azimuthal bins or the set of axial bins, such as density and other formation properties. Alternatively, the collected measurements themselves can be stored in the respective set of bins, such as count rates. For each azimuthal bin in the set of azimuthal bins, and for each axial bin in the set of axial bins, the filtering process can be applied.

The filtering process adjusts the stored or computed measurements utilizing the values stored in the target bin and neighboring bins utilizing a set of filter coefficients. There can be one or more sets of filter coefficients. If more than one set of filter coefficients is used, the results from each set of filter coefficients, e.g., interim filtered values, can be blended together algorithmically to generate a final filtered value, such as computing an average, a mean, or a median, and other blending techniques. There can be a separate set of filter coefficients for the azimuthal and axial processing, such as a set of azimuthal filter coefficients and a set of axial filter coefficients, or the same set of filter coefficients can be utilized for the azimuthal and axial orientations. Each set of filter coefficients total one and contain at least one positive filter coefficient and at least one negative filter coefficient, e.g., deconvolution filtering. This ensures the filter maintains the integrity of the original measurements while avoiding broadening the computed measurements.

The value of each of the filter coefficients in the set of filter coefficients can vary. In some aspects, the values, when plotted, can form a rough 'w' shape, as demonstrated in FIG. 3 using a set of eleven bins. When additional bins are used, the filter coefficients, when plotted, can form a more rounded appearance. Since filtering is applied using binned values on either side of a target bin, the number of coefficients can be equal on both sides of the target bin with an additional coefficient for the target bin itself, hence the total number of filter coefficients needed is n+1, with the set of filter coefficients equal to 2n+1, where 2n allows for similar filter coefficients on both sides of the target bin. In other aspects, the number of filter coefficients does not need to be equivalent on either side of the target bin. The filter coefficient to be utilized for a bin can be computed using Equation 1.

Equation 1: Example filter coefficient computation $$\overline{y}_i = \sum_{j=-n}^{n} c_j y_{i+j}$$

where
$\overline{y}_i$ is the bin being computed;
$y_i$ is the value stored in bin i;
$c_j$ is the $j^{th}$ coefficient in the set of filter coefficients; and
2n+1 is the number of coefficients in the set of filter coefficients.

For example, negative subscripts on y can be incremented by the respective bin count, such as the azimuthal bin count or the axial bin count. Subscripts greater than or equal to the bin count can be decremented by the bin count. When sixteen bins are utilized, a subscript of −5 can become 11 and the target bin can be identified as a subscript of 0. A subscript of 16 would also be adjusted to a subscript of 0.

The ratio of the sum of the negative coefficients to the sum of positive coefficients controls the amount of deconvolution. The statistical uncertainty of the filtered value can be approximately equal to the square root of the sum of the squares of the filter coefficients multiplied by the uncertainty of the unfiltered value. For small amounts of deconvolution, the filtered value can have a smaller statistical uncertainty than the unfiltered value. The reverse applies for large amounts of deconvolution, e.g., the filtered value can have a larger statistical uncertainty than the unfiltered value. The filter coefficients can be adjusted to provide a target amount of deconvolution or a target statistical uncertainty, e.g., a target filter ratio. Narrow azimuthal measurements can be enhanced by increasing the ratio of the sum of negative filter coefficients to the sum of positive filter coefficients.

The optimum set of filter coefficients can depend on the inherent statistical uncertainty of the collected measurements. An uncertainty calculation can be utilized to determine if the set of filter coefficients satisfies the statistical uncertainty constraint. There can be more than one set of filter coefficients that satisfy the constraint and one of the sets can be selected as the desired set of filter coefficients. A set of filter coefficients that can reduce the statistical uncertainty while minimizing the broadening or narrowing the image can be utilized.

In an alternate aspect, the azimuthal and axial filtering process can be applied simultaneously. The filtering process can become multi-dimensional in this aspect. Equation 2 demonstrates the two-dimensional bin computation.

Equation 2 : Example azimuthal and axial filtering $$\overline{y_{i,j}} = \sum_{k=-n_1}^{n_1} \sum_{m=-n_2}^{n_2} c_{k,m} y_{i+k,j+m}$$

where $y_{i,j}$ is the value stored in the bin i,j;

$c_{k,m}$ is the filter coefficient in the set of filter coefficients; and $2n_1+1$ is the number of filter coefficients in the set of azimuthal filter coefficients and $2n_2+1$ is the number of filter coefficients in the set of axial filter coefficients. The numbers $n_1$ and $n_2$ may be the same or different.

The filter process can be applied using the above Equation 1. From the set of azimuthal bins and axial bins, a subset of a target bin and bins surrounding the target bin can be selected. When applying the filter to azimuthal bins, all the bins must have the same axial position. When applying it to axial bins, all the bins must have the same azimuth.

In the azimuthal aspect, a first half of the subset of azimuthal bins can be oriented in one of a clockwise angular, direction or a counterclockwise angular direction, with a second half of the subset of azimuthal bins oriented in the other azimuthal angular direction. The number of bins on the clockwise and counterclockwise sides of the target bin are preferably equal. In other aspects, the number of bins can differ. The number of neighboring azimuthal bins in each relative direction of the azimuthal target bin can be determined by the executing process, determined by the number of filter coefficients in the set of azimuthal filter coefficients, or determined by the number of azimuthal bins. In some aspects, the clockwise angular direction and the counterclockwise angular direction can be limited to a maximum of 180° (degrees) of angular direction. This can prevent overlapping a bin in the subset of azimuthal bins with more than one filter coefficient, e.g., prevent a wraparound effect.

In the axial aspect, a first half of the subset of axial bins can be oriented in an axial direction of one of uphole or downhole, with a second half of the subset of axial bins oriented in the other axial direction. The number of bins in the subset of axial bins on the uphole and downhole sides of the target bin are preferably equal. In other aspects, the number of bins can differ. The number of neighboring axial bins in each relative direction of the axial target bin can be determined by the executing process, determined by the number of filter coefficients in the set of axial filter coefficients, or determined by the number of axial bins.

The corresponding azimuthal filter coefficients or axial filter coefficients can be applied to the respective of the subset of azimuthal bins or the subset of axial bins. The filtered value of the target bin is computed using Equation 1 by multiplying each subset bin, e.g., neighboring azimuthal or axial bins in both directions, by its corresponding filter coefficient and summing the results. The process can be repeated for each available azimuthal bin and axial bin, where each bin is selected as the target bin. The process uses the collected measurements or the computed measurements from the target bin and two subsets of bins. Alternatively, the axial filter may use azimuthally-filtered values and the azimuthal filter may use axially-filtered values. Therefore, if a parallel processing computing system is utilized, for example, a single instruction, multiple data (SIMD) processor, one or more of the filtered values can be computed for the target bins in parallel.

The filter process can also be applied using the above Equation 2. In that case, the two subsets of bins used when applying the azimuthal filter and the two subsets of bins used to apply the axial filter are used to define a full subset to be used to apply Equation 2. A bin that that has an azimuth corresponding to a bin in the azimuthal subsets and an axial position corresponding to a bin in the axial subsets is included in the full subset, along with the target bin. The filtered value of the target bin is computed using Equation 2 by multiplying each subset bin, by its corresponding filter coefficient and summing the results.

Turning now to the figures, FIG. 1A is an illustration of a diagram of an example drilling system 101, for example, a logging while drilling (LWD) system, a measure while drilling (MWD) system, and other drilling systems. Drilling system 101 includes a derrick 105 supporting drill string 115, and well site controller 107. Well site controller 107 includes a processor and a memory and is configured to direct operation of drilling system 101. Derrick 105 is located at a surface 106. Extending below derrick 105 is a borehole 110 in which drill string 115 is inserted, where borehole 110 is surrounded by subterranean formation 130. The axis of borehole 110 is the longitudinal axis. Located at the bottom of drill string 115 is a downhole tool 120. Downhole tool 120 can include various downhole tools and bottom hole assemblies (BHA), a drill bit 122, and a data filterer 124. Other components of downhole tool 120 can be present, such as a local power supply, or batteries and capacitors to store power received from another system.

In this example, downhole tool 120 can include a nuclear measurement tool and data filterer 124 can receive collected measurements from the nuclear measurement tool and apply one or more filters to the collected measurements, such as an azimuthal or an axial filter as described herein. The collected measurements and the filtered values can be communicated to one or more systems, for example, to well site controller 107 and a surface computing system 108. In an alternate aspect, the collected measurements can be transmitted to well site controller 107 or surface computing system 108 and the azimuthal and axial filtering processes can be applied in those systems. Borehole site operators or engineers can then analyze the resulting filtered values, such as using an image representation of the filtered values, and adjust the system operation plan or adjust drilling parameters.

Figure 1B:
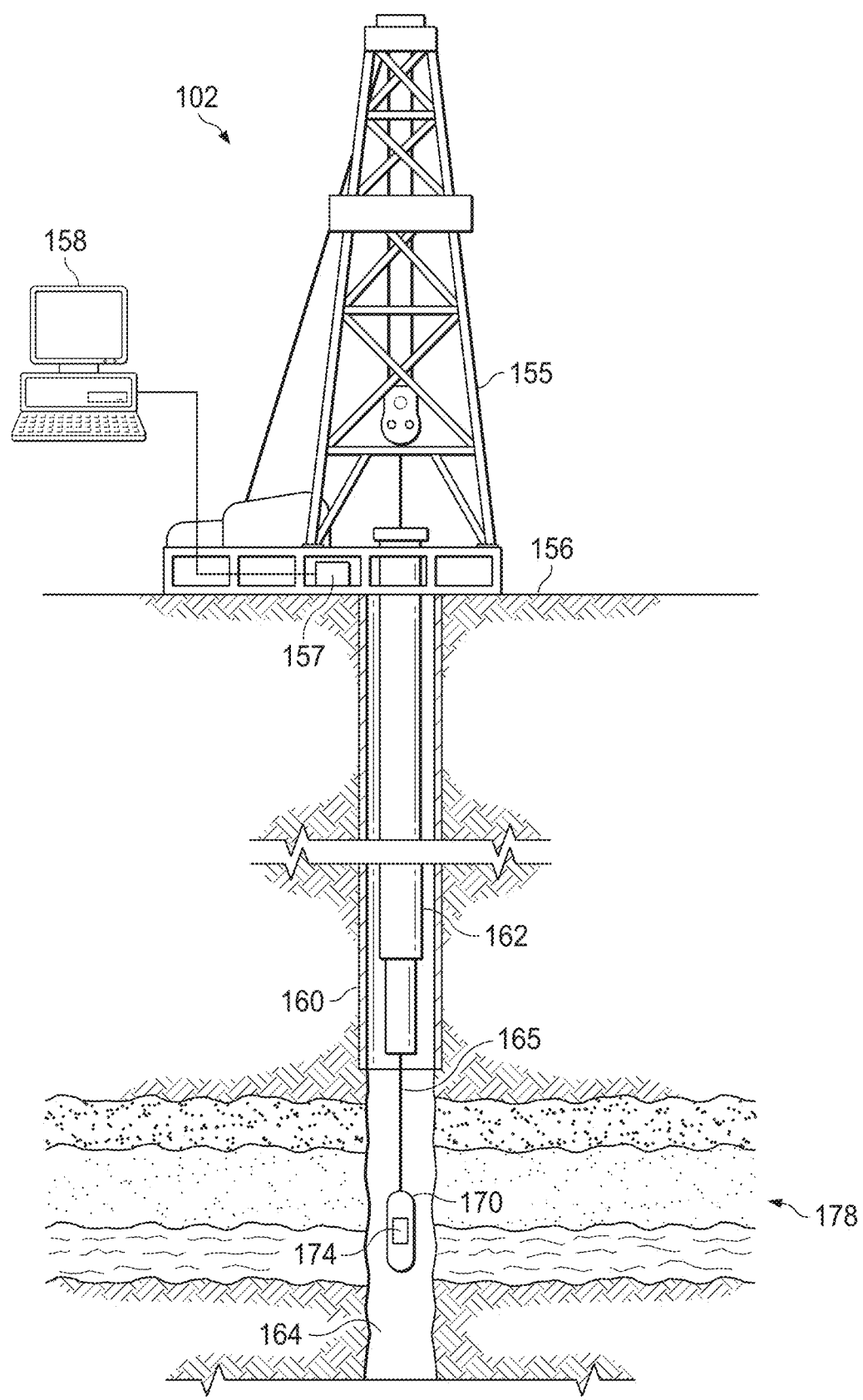
FIG. 1B is an illustration of a diagram of an example measuring system.

FIG. 1B is an illustration of a diagram of an example measuring system 102, for example, a wireline well system. Measuring system 102 includes derrick 155 located at a surface 156 and well site controller 157. Well site controller 157 includes a processor and a memory and is configured to direct operation of measuring system 102. Below derrick 155 is borehole 160 that has two cased sections 162 and one uncased section 164, where borehole 160 is surrounded by subterranean formation 178. The axis of borehole 160 is the longitudinal axis. A wireline 165 is suspended in borehole 160 from derrick 155. At the lower end of wireline 165 are downhole tools 170 and a data filterer 174. A winch (not shown) can cooperate with the derrick 155 for lowering and raising of the wireline 165 in the borehole 160.

Downhole tools 170 can be a measurement tool, such as a density tool, a gamma ray tool, a nuclear measurement tool, an acoustic tool, a resistivity tool, a fiber optic sensor, a distributed acoustic sensor (DAS), and other types of downhole measuring tools. Downhole tools 170 can transmit the collected measurements to data filterer 174. Data filterer 174 can apply zero, one, or more filters to the measurements and transmit the measurements and the filtered values to another system, such as well site controller 157 or a surface computing system 158.

Although FIGS. 1A and 1B depict specific borehole configurations, those skilled in the art will understand that the disclosure is equally well suited for use in boreholes having other orientations including vertical boreholes, horizontal boreholes, slanted boreholes, multilateral boreholes, and other borehole types. FIGS. 1A and 1B depict an onshore operation. Those skilled in the art will understand that the disclosure is equally well suited for use in offshore operations or production well systems.

Figure 2A:
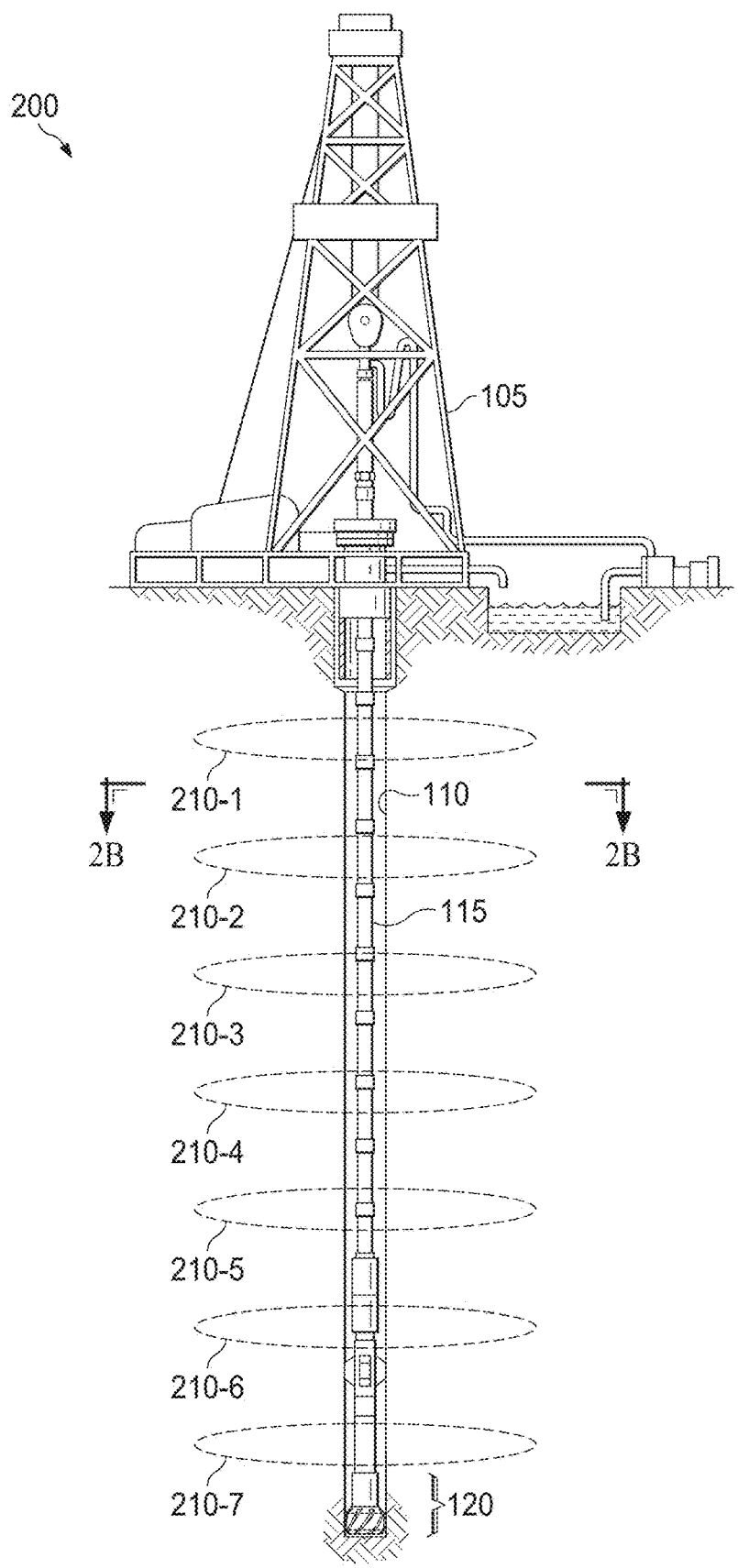
FIG. 2A is an illustration of a diagram of an example axial binning.

FIG. 2A is an illustration of a diagram of an example axial binning 200. Axial binning 200 is showing a drilling system for demonstration purposes. Other borehole systems can be utilized as well. Similar to FIG. 1A, axial binning 200 has derrick 105 supporting drill string 115 with downhole tools 120 lowered into borehole 110. As downhole tools 120 are lowered, the included measuring tools can be utilized to collect measurements from the surrounding subterranean formations. This can be done at a uniform or nearly uniform distance from the previous axial measurement position. The uniformity of the distance between axial measurement positions can aide in representing the measurements as an image. In other aspects, non-uniform distances can be used for determining the axial positions.

Axial position 210-1, axial position 210-2, axial position 210-3, axial position 210-4, axial position 210-5, axial position 210-6, axial position 210-7, collectively axial positions 210, demonstrate locations along the axis of the borehole where measurements can be collected. The measurements may consist of one measurement at or near that point, or they may consist of a collection of measurements about that point. The distance between the axial positions can be various values, such as 0.1 meters. Axial binning 200 is showing 7 axial positions 210 for clarity, though the number of bins utilized in an implementation can vary to the hundreds, thousands, or greater number of bins. Axial binning 200 also shows a cross section view indicator 2B.

Figure 2B:
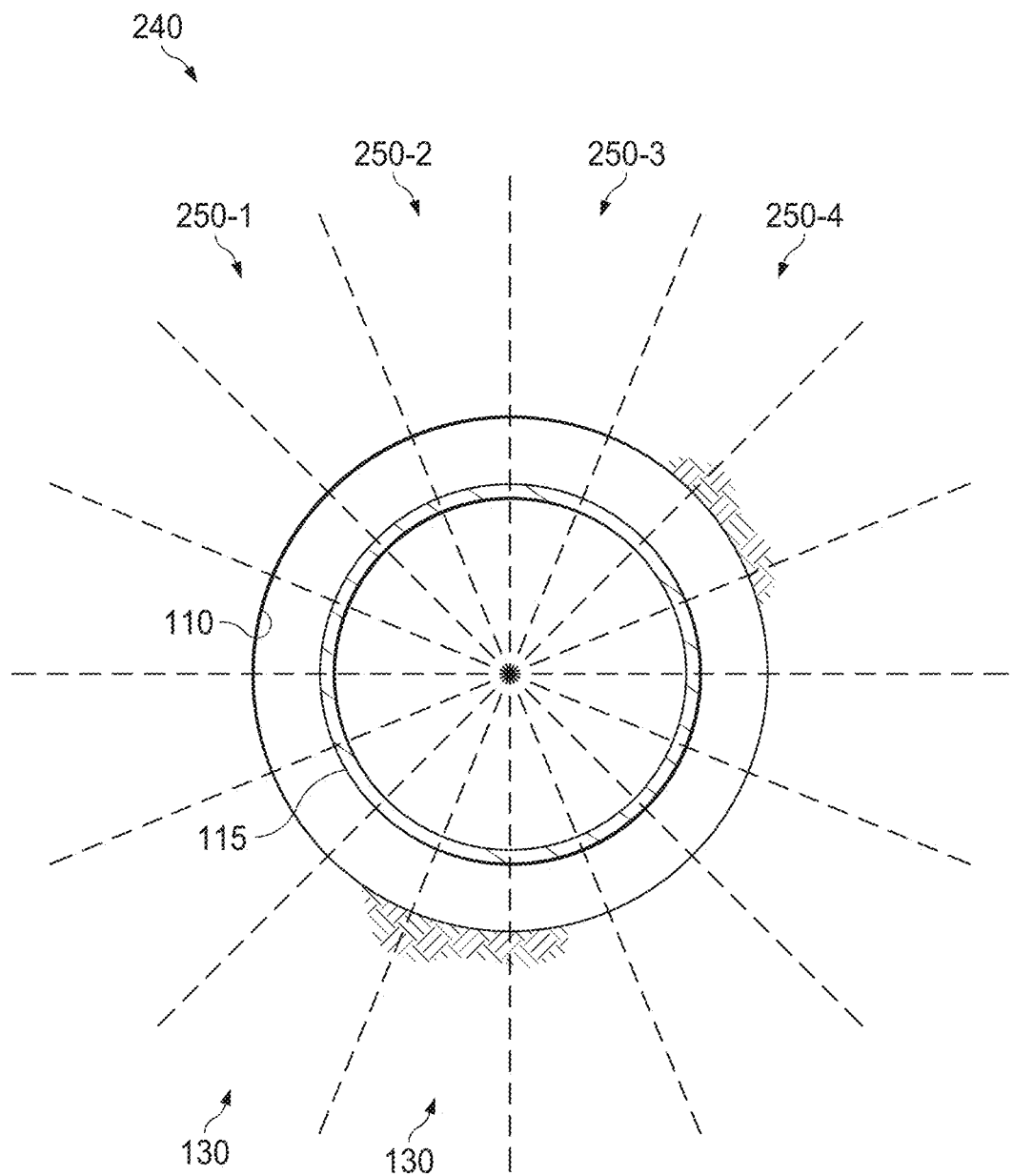
FIG. 2B is an illustration of a diagram of an example cross-sectional view of azimuthal binning.

FIG. 2B is an illustration of a diagram of an example cross sectional view of azimuthal binning 240. Borehole 110 is shown as the outer diameter of the outer hatched circle and drill string 115 is the inner hatched circle. Borehole 110 is surrounded by subterranean formation 130. The azimuthal cross-sectional view is divided into sixteen equal portions or sections, where the collected measurements from each portion is stored in an azimuthal bin. Each azimuthal bin covers approximately the same range of azimuths, e.g., radial angle degrees, in this case, approximately 22.5°. Azimuthal bin 250-1, azimuthal bin 250-2, azimuthal bin 250-3, and azimuthal bin 250-4, collectively, set of azimuthal bins 250, are highlighted for demonstration purposes. Set of azimuthal bins 250 typically would include the bins encompassed by a 360° range of azimuths.

FIG. 3 is an illustration of a diagram of an example filter coefficient chart 300 applied for a selected target bin. Filter coefficient chart 300 demonstrates a sample distribution of filter coefficients that can be used as the set of azimuthal filter coefficients and the set of axial filter coefficients. Filter coefficient chart 300 is showing eleven bins in the subset of bins for clarity; typically, a minimum of sixteen bins is recommended. Filter coefficient chart 300 includes an x-axis 310 showing the relative bin position, a y-axis 312 showing the filter coefficient values, and a plot 314 showing the plotted filter coefficients.

X-axis 310 is centered at the designated target bin and has five clockwise and five counterclockwise bin positions. The sum of the filter coefficients, as indicated by y-axis 312, equals one to maintain the average of the measurements. Y-axis 312 shows positive and negative filter coefficients indicating a deconvolution technique to avoid broadening the computed measurements from the collected measurements.

Plot 314 has several data points plotted, where the data points form a rough 'w' shape. Data point 320 represents the filter coefficient for the target bin, where a filter coefficient of approximately 0.32 is multiplied by the computed measurements in the target bin. Data point 322 represents the filter coefficient for one bin in the subset of bins, where a filter coefficient of approximately 0.225 is multiplied by the measured value in that bin. Data point 324 represents the filter coefficient for another bin in the subset of bins, where a filter coefficient of approximately −0.049 is multiplied by the computed measurements in that bin. The sum of the computed measurements is then stored in the target bin as the filtered value.

The set of filter coefficient representative shape can be other than a 'w'. The 'w' representative shape can be relatively simpler to adjust to accommodate different bin spacings and different filter ratios than other representative shapes. Deconvolution properties of the filter are sensitive to the difference in slopes between the inner and outer portions of the 'w' shape. The inner portion of the 'w' shape is shown for demonstration as inner coefficients 330, e.g., the collection of data points that form the inner portion of the representative shape on at least one side of the target bin data point 320. The outer portion of the 'w' shape is shown for demonstration as outer coefficients 332, e.g., the collection of data points that form the outer portion of the representative shape on at least one side of the target bin data point 320. For example, in plot 314 the slope between data point 320 and data point 322 is four times greater in magnitude that the slope between data point 324 and data point 326. The slope difference can be beneficial towards the desired results.

FIG. 4 is an illustration of a diagram of an example image set 400 with multiple filters applied. Image set 400 demonstrates the application of the azimuthal and axial filters to an image representation of collected measurements. Image 410 is an image representation from the original measurements taken by a downhole tool of the subterranean formation.

Image 412 is image 410 with the azimuthal filter process applied. Image 412 appears to have a sharper, clearer image as compared to the blocky appearance of image 410. Image 414 is image 412 with the axial filter process applied. Image 414 appears to have a sharper and clear appearance than image 410 and image 412. Image 414 can be used by a borehole operator or engineer for analysis to determine if changes or adjustments are needed to borehole operations, such as modifying the drilling operation plan.

Figure 5:
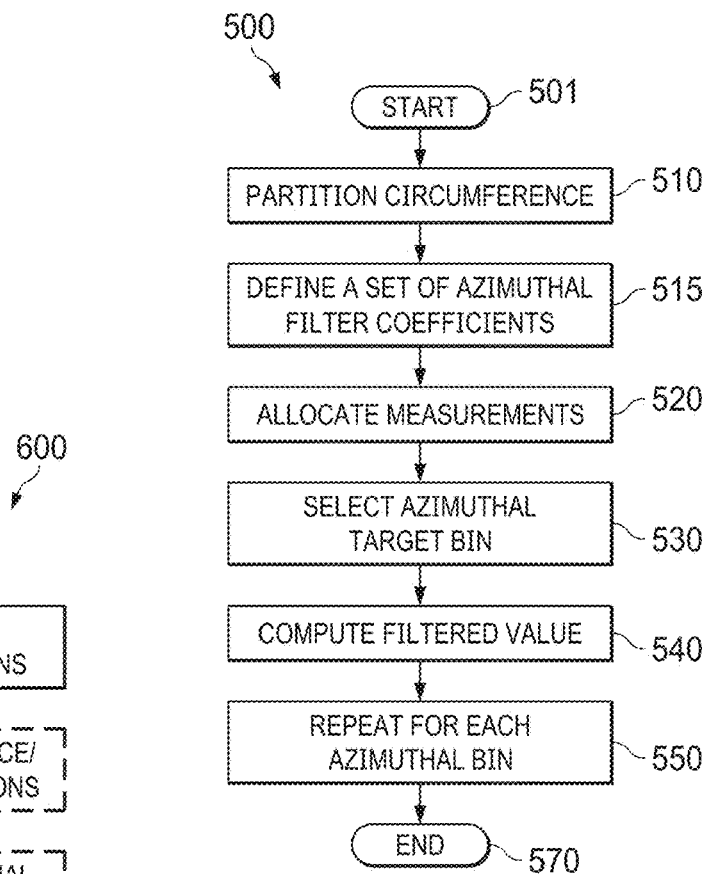
FIG. 5 is an illustration of a flow diagram of an example method for applying an azimuthal filter.

FIG. 5 is an illustration of a flow diagram of an example method 500 for applying an azimuthal filter to collected downhole measurements. Method 500 can receive downhole measurements, allocate the measurements to nearly evenly spaced bins, and apply an azimuthal filter to the measurements. Method 500 can be enabled by a data filterer located proximate the downhole tools in a borehole or located proximate surface equipment, such as a well site controller or surface computing system. Method 500 starts at a step 501 and proceeds to a step 510.

In step 510, the azimuthal range of the collected measurements can be partitioned into equal or nearly equal degrees, of the borehole circumference, of the azimuthal range defining a set of azimuthal bins, where the collected measurements within each set of degrees is stored in an azimuthal bin. Typically, the azimuthal range is 360°. In other aspects, the azimuthal range of the downhole tool collecting the measurements can be less than 360°, for example, having a measurement collection arc of 180°.

In a step 515 the set of azimuthal filter coefficients is defined. The filter coefficients sum to one and include at least one positive and at least one negative filter coefficient. The number of filter coefficients can be various numbers such as 16, or hundreds to thousands of entries. In a step 520, the measurements are allocated to the azimuthal bins. The azimuthal bin can store the collected measurement, such as count rates, or the azimuthal bin can store a computed measurement, such as values relating to formation properties.

In a step 530, an azimuthal target bin is selected. The initial selection is arbitrary as each azimuthal bin will be selected as the azimuthal target bin in turn. In some aspects where a parallel processing system is being utilized, each azimuthal bin in the set of azimuthal bins can be parallelly selected as the azimuthal target bin. In a step 540, the computed measurements or the collected measurements in the azimuthal target bin and its neighboring azimuthal bins in the clockwise and counterclockwise angular directions are multiplied by the corresponding entry in the set of azimuthal filter coefficients. The products of each multiplication is summed and stored in the azimuthal target bin as the computed filtered value. For example, the azimuthal target bin can store the collected measurements for its designated angular range, computed measurements, interim products from multiplication by the azimuthal filter coefficients, and a filtered value.

In a step 550 the next azimuthal target bin is selected and the set of azimuthal filter coefficients is applied to the corresponding of the neighboring azimuthal bins. Once each azimuthal bin in the set of azimuthal bins has been processed, the stored values can be transmitted to other systems in various combinations, for example, transmitting the collected measurements or the filtered values to a well site controller or surface computing system. The repetition of the process ends at a step 570.

Figure 6:
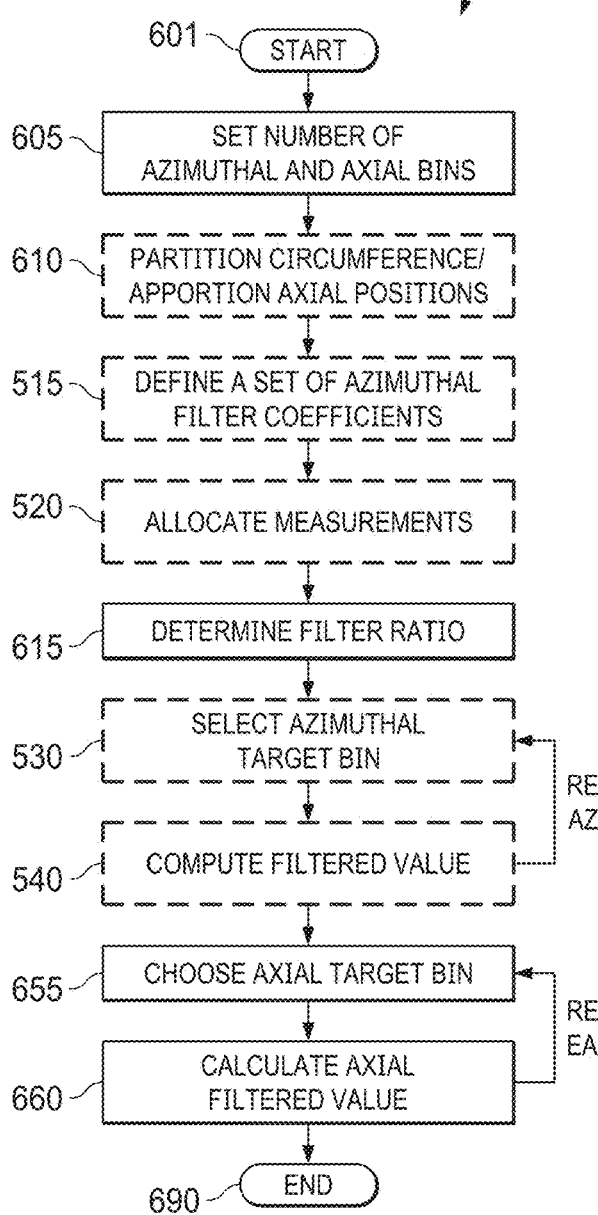
FIG. 6 is an illustration of a flow diagram of an example method, building on FIG. 5, for applying an azimuthal and axial filter.

FIG. 6 is an illustration of a flow diagram of an example method 600 for applying an azimuthal and axial filter. Method 600 builds on method 500 of FIG. 5 by adding filter ratios and axial filter processing. Method 500 steps are shown using dashed boxes. Method 600 starts at a step 601 and proceeds to a step 605 where the process sets the number of azimuthal bins (azimuthal bin count), the number of axial bins (axial bin count), and one or more sets of filter coefficients. These parameters can be provided to the data filterer, such as from a well site controller, or they can be defaulted to determined parameters. There can be a separate set of filter coefficients for the azimuthal and axial subprocesses, as well as separate sets of filter coefficients.

Method 600 proceeds to step 610. Step 610 includes the processing steps of step 510 and further includes apportioning axial positions into approximately uniform distance ranges. The collected measurements are allocated to the respective axial bin representing the axial position of the collected measurements. Method 600 proceeds to step 515 and step 520 before proceeding to a step 615 where a filter ratio is determined for the collected measurements. The parameters set in step 605 are utilized as the initial parameters that can be modified as analysis of the collected measurements is conducted. Utilizing the type, quality, and quantity of the collected measurements, the data filterer can adjust the filter ratio, i.e., adjust the filter coefficients in the set of filter coefficients. The target filter ratio and uncertainty deviations can be used to guide the analysis. There can be a separate adjusted filter ratio for the azimuthal and axial processes.

Method 600 proceeds to step 530 and step 540. Step 550 has been summarized as the bracket annotated as "Repeat for each azimuthal bin". Once step 540/step 550 has completed, method 600 proceeds to a step 655. In step 655, similar to step 530, an axial target bin is chosen for subsequent processing. The initial selection is arbitrary as each axial bin will be selected as the axial target bin in turn. In some aspects where a parallel processing system is being utilized, each axial bin in the set of axial bins can be parallelly selected as the axial target bin.

In step 660, similar to step 540, the axial filtered value is calculated. The computed measurements or the collected measurements in the axial target bin and the neighboring axial bins in the uphole and downhole directions are multiplied by the corresponding entry in the set of axial filter coefficients. The axial bin computed measurements are those values that were previously computed in step 540, whereby the axial process builds on the azimuthal process. The products of each multiplication is summed and stored in the axial target bin as the axial filtered value. The axial target bin can store collected measurements, computed measurements, interim products from the calculations, and axial filtered values.

When approaching the beginning or end of the axial positions there may not be enough bins on one side of the target bin to apply the designated filter coefficients. At this point in the process, in some aspects no filter can be applied and in other aspects the filter can be partially applied. In aspects where the filter is partially applied, the missing axial values can be considered zero. The resultant filtered value is then renormalized to maintain the proper average. To renormalize, the initial filtered value is divided by the sum of filter coefficients that contribute to the initial value. Step 655 and step 660 are re-executed for each axial bin in the set of axial bins. Method 600 proceeds to a step 690 once the re-execution for each axial bin of step 655 and step 660 have completed.

Figure 7:
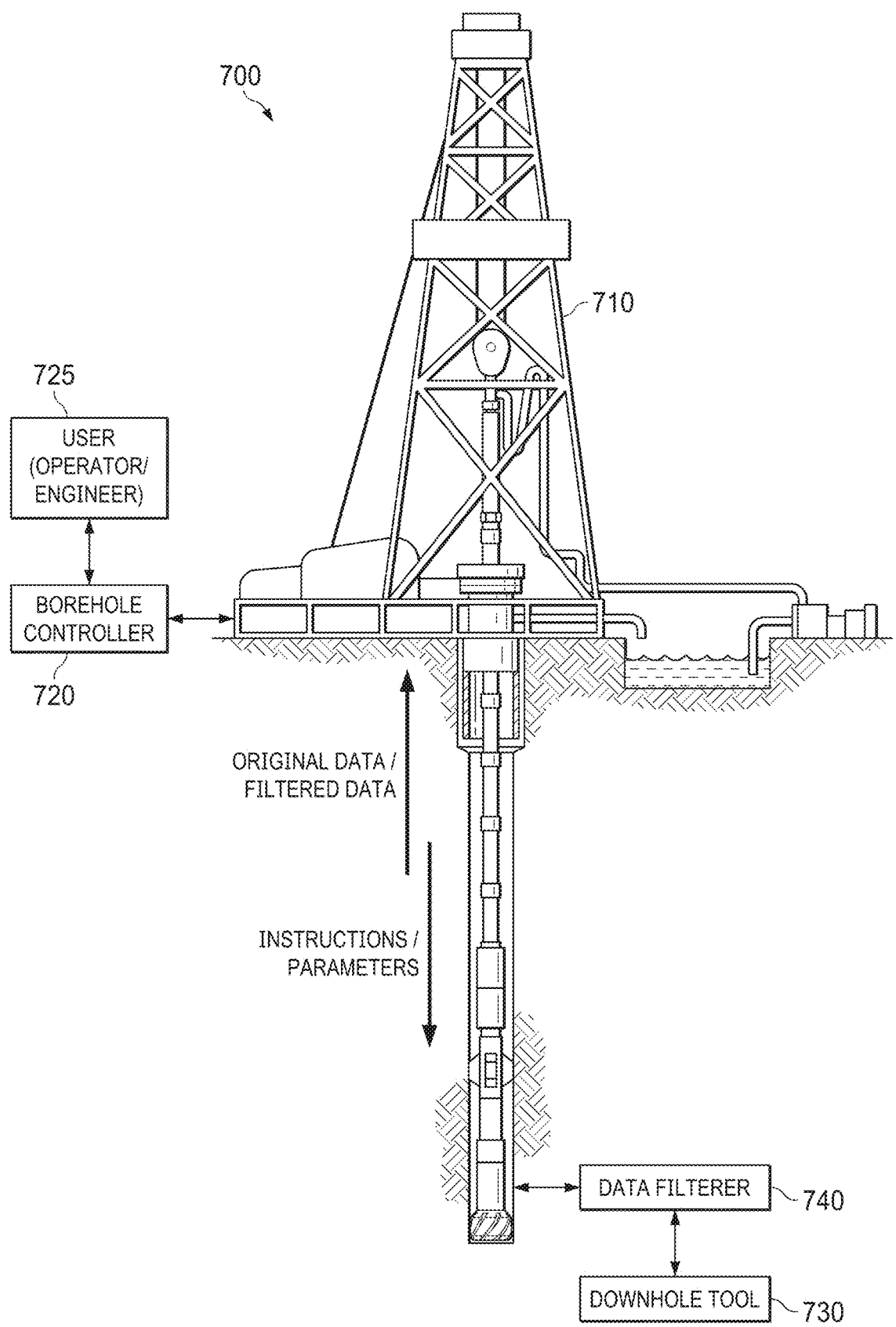
FIG. 7 is an illustration of a block diagram of an example sharpening system for data representation using a subterranean formation measurement filter.

FIG. 7 is an illustration of a block diagram of an example sharpening system 700 for data representation using a subterranean formation measurement filter. Sharpening system 700 can receive collected subterranean formation measurements and apply filters to sharpen the data representation, such as using an image, to improve the quality of the resulting data representation. Sharpening system 700 can be implemented in various types of boreholes, such as a borehole used for hydrocarbon production, a borehole used for research, and other types of boreholes.

Sharpening system 700 includes surface equipment 710, a borehole controller 720, a downhole tool 730, and a data filterer 740. Surface equipment 710 can be a derrick, crane, and other types of surface equipment and tools that can support drilling operations, measuring operations, and other borehole activities. Borehole controller 720, such as a well site controller or other type of controller, can direct operations at the borehole, including directing downhole tool 730 and data filterer 740. A user 725 can specify the parameters to be used by data filterer 740, such as the azimuthal bin count, the axial bin count, statistical uncertainty constraints, sets of filter coefficients, and target filter ratios. The specified parameters can be transmitted along with instructions to downhole tool 730 and data filterer 740 using borehole controller 720.

Downhole tool 730 can be one or more tools, power sources, and other devices to carry out the operations. Downhole tool 730 can be a density tool, a gamma ray tool, a nuclear measurement tool, an acoustic tool, a resistivity tool, a fiber optic sensor, a DAS and other types of downhole measuring tools capable of collecting measurements of the surrounding subterranean formation. Downhole tool 730 can communicate the collected measurements to data filterer 740 for further processing as described herein.

Data filterer 740 can be proximate downhole tool 730, be part of downhole tool 730, or be located with borehole controller 720. Data filterer 740 can be a computing device capable of executing instructions and receiving and transmitting data. In an alternate aspect, data filterer 740 can be a series of instructions included within another computing system, such as downhole tool 730, borehole controller 720, surface computing system 108 as shown in FIG. 1A, or other computing systems. In this aspect, data filterer 740 can be application code, software, a dynamic link library, a function, a module, or other executable instructions stored in ROM, RAM, cache memory, hard drive, or other storage mechanism.

Data filterer 740, and downhole tool 730, together or separately, can be capable of transmitting collected measurements, computed measurements, filtered values, and interim calculated values to borehole controller 720 for use by user 725. User 725 can be a borehole operator, engineer, or other type of user, and can analyze the resulting sharpened image from the received data and adjust the borehole operations according to the analysis. For example, geosteering can be enabled by user 725 by adjusting drilling operations utilizing the sharpened image analysis.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

Aspects disclosed herein include:
A. A method to filter measurements, from a subterranean formation, collected along an axis of a borehole of a well system, including: (1) partitioning a circumference of the borehole into a set of azimuthal bins, wherein each azimuthal bin represents a range of azimuths at a same axial position, (2) defining a set of azimuthal filter coefficients including at least one positive filter coefficient and at least one negative filter coefficient, (3) allocating the measurements to the set of azimuthal bins using the range of azimuths corresponding with each measurement, (4) selecting an azimuthal target bin and a determined number of neighboring azimuthal bins from the set of azimuthal bins to form an azimuthal subset of bins, (5) computing a filtered value for the azimuthal target bin by multiplying each measurement in the azimuthal subset of bins by a corresponding azimuthal filter coefficient from the set of azimuthal filter coefficients and summing products resulting from the multiplying, and (6) repeating the selecting and the computing for each azimuthal bin in the set of azimuthal bins.

B. A system to filter measurements from a subterranean formation collected along an axis of a borehole of a well system, including: (1) a downhole tool, operable to collect the measurements, (2) a data filterer, operable to receive the measurements from the downhole tool and generate filtered values by applying one or more filters to the measurements using an azimuthal binning of the measurements, and (3) a controller, operable to receive the filtered values from the data filterer and to utilize the filtered values to sharpen an image derived from the measurements, wherein the data filterer utilizes a set of azimuthal filter coefficients in the applying, and the set of azimuthal filter coefficients includes at least one positive filter coefficient and at least one negative filter coefficient, wherein the controller is one or more of a well site controller and a surface computing system.

C. A computer program product having a series of operating instructions stored on a non-transitory computer-readable medium that directs a data processing apparatus when executed thereby to perform operations to filter measurements, from a subterranean formation, collected along an axis of a borehole of a well system, the operations including: (1) partitioning a circumference of the borehole into a set of azimuthal bins, wherein each azimuthal bin represents a range of azimuths, (2) defining a set of azimuthal filter coefficients including at least one positive filter coefficient and at least one negative filter coefficient, (3) allocating the measurements to the set of azimuthal bins using the range of azimuths corresponding with each measurement, (4) selecting an azimuthal target bin and a determined number of neighboring azimuthal bins from the set of azimuthal bins to form an azimuthal subset of bins, (5) computing a filtered value for the azimuthal target bin by multiplying each measurement in the azimuthal subset of bins by a corresponding azimuthal filter coefficient from the set of azimuthal filter coefficients and summing products resulting from the multiplying, and (6) repeating the selecting and the computing for each azimuthal bin in the set of azimuthal bins.

Each of aspects A, B, and C can have one or more of the following additional elements in combination: Element 1: wherein the filtered value for each of the azimuthal target bins is utilized to sharpen an image derived from the measurements. Element 2: wherein a sum of the set of azimuthal filter coefficients equals one. Element 3: further including setting the determined number of neighboring azimuthal bins in the azimuthal subset of bins to a bin count parameter. Element 4: wherein the bin count parameter is a minimum of fifteen bins. Element 5: wherein the measurements represent an image of the borehole and comprise count rates or computed measurements. Element 6: wherein the measurements are collected using one of a density tool, a gamma ray tool, a nuclear measurement tool, an acoustic tool, a resistivity tool, a fiber optic sensor, and a distributed acoustic sensor. Element 7: wherein a plot of the set of azimuthal filter coefficients forms a representative w shape. Element 8: a first slope of inner coefficients of the plot is larger in magnitude than a second slope of outer coefficients of the plot. Element 9: wherein an equal number of azimuthal bins are oriented in a clockwise and a counterclockwise angular direction from the azimuthal target bin. Element 10: wherein narrow azimuthal measurements are enhanced by increasing a filter ratio of a sum of negative filter coefficients to a sum of positive filter coefficients. Element 11: wherein the defining utilizes a resultant statistical uncertainty of the filtered value and a statistical uncertainty parameter. Element 12: further including executing the selecting, computing, and repeating, for each azimuthal target bin, for two or more sets of filter coefficients. Element 13: wherein the filtered value is an average of interim filtered values computed from each set of azimuthal filter coefficients. Element 14: further including apportioning the borehole into a set of axial bins for each range of azimuths. Element 15: further including determining a set of axial filter coefficients that includes at least one positive filter coefficient and at least one negative filter coefficient. Element 16: further including allotting the measurements to the set of axial bins using the range of azimuths and axial position of each measurement. Element 17: further including choosing an axial target bin and a determined number of neighboring axial bins from the set of axial bins to form an axial subset of bins. Element 18: further including calculating a final filtered value for the axial target bin by multiplying the filtered value in each of the axial subset of bins by a corresponding axial filter coefficient from the set of axial filter coefficients and summing products resulting from the multiplying. Element 19: further including re-execute the choosing and the calculating for each axial bin in the set of axial bins. Element 20: wherein the azimuthal target bin and the axial target bin correspond to a matching axial position and a range of azimuths. Element 21: the computing and the calculating are performed in parallel. Element 22: wherein the set of axial filter coefficients is equivalent to the set of azimuthal filter coefficients. Element 23: wherein each axial position is separated by a uniform distance. Element 24: wherein the data filterer is further operable to use an axial binning of the measurements, an axial filter, and a set of axial filter coefficients. Element 25: the measurements are collected at two or more axial positions within the borehole. Element 26: wherein the downhole tool is one of a nuclear measurement tool, a density tool, a gamma ray tool, an acoustic tool, a resistivity tool, a fiber optic sensor, and a distributed acoustic sensor tool. Element 27: wherein the data filterer receives parameters from the controller, where the parameters include one or more of an azimuthal bin count, an axial bin count, and one or more sets of filter coefficients.

What is claimed is:

1. A method to filter measurements, from a subterranean formation, collected along an axis of a borehole of a well system, comprising:
partitioning a circumference of the borehole into a set of azimuthal bins, wherein each azimuthal bin represents a range of azimuths at a same axial position;
defining a set of azimuthal filter coefficients including at least one positive filter coefficient and at least one negative filter coefficient;

allocating the measurements to the set of azimuthal bins using the range of azimuths corresponding with each measurement;

selecting an azimuthal target bin and a determined number of neighboring azimuthal bins from the set of azimuthal bins to form an azimuthal subset of bins;

computing a filtered value for the azimuthal target bin by applying a deconvolution process by multiplying each measurement in the azimuthal subset of bins by a corresponding azimuthal filter coefficient from the set of azimuthal filter coefficients and summing products resulting from the multiplying, and determining an amount of deconvolution utilizing a ratio of a sum of the at least one negative filter coefficient to a sum of the at least one positive filter coefficient; and repeating the selecting and the computing for each azimuthal bin in the set of azimuthal bins.

2. The method as recited in claim 1, wherein the filtered value for each of the bins in the set of azimuthal bins is utilized to sharpen an image derived from the measurements.

3. The method as recited in claim 1, wherein a sum of the set of azimuthal filter coefficients equals one.

4. The method as recited in claim 1, further comprising: setting the determined number of neighboring azimuthal bins in the azimuthal subset of bins to a bin count parameter.

5. The method as recited in claim 4, wherein the bin count parameter is a minimum of fifteen bins.

6. The method as recited in claim 1, wherein the measurements represent an image of the borehole and comprise count rates or computed measurements.

7. The method as recited in claim 1, wherein the measurements are collected using one of a density tool, a gamma ray tool, a nuclear measurement tool, an acoustic tool, a resistivity tool, a fiber optic sensor, and a distributed acoustic sensor.

8. The method as recited in claim 1, wherein a plot of the set of azimuthal filter coefficients forms a representative w shape and a first slope of inner coefficients of the plot is larger in magnitude than a second slope of outer coefficients of the plot.

9. The method as recited in claim 1, wherein an equal number of azimuthal bins are oriented in a clockwise and a counterclockwise angular direction from the azimuthal target bin.

10. The method as recited in claim 1, wherein narrow azimuthal measurements are enhanced by increasing a filter ratio of a sum of negative filter coefficients to a sum of positive filter coefficients.

11. The method as recited in claim 10, wherein the defining utilizes a resultant statistical uncertainty of the filtered value and a statistical uncertainty parameter.

12. The method as recited in claim 1, further comprising, executing the selecting, computing, and repeating, for each azimuthal target bin, for two or more sets of filter coefficients, and wherein the filtered value is an average of interim filtered values computed from each set of azimuthal filter coefficients.

13. The method as recited in claim 1, further comprising: apportioning the borehole into a set of axial bins for each range of azimuths;

determining a set of axial filter coefficients that includes at least one positive filter coefficient and at least one negative filter coefficient;

allotting the measurements to the set of axial bins using the range of azimuths and axial position of each measurement;

choosing an axial target bin and a determined number of neighboring axial bins from the set of axial bins to form an axial subset of bins;

calculating a final filtered value for the axial target bin by multiplying the filtered value in each of the axial subset of bins by a corresponding axial filter coefficient from the set of axial filter coefficients and summing products resulting from the multiplying; and re-execute the choosing and the calculating for each axial bin in the set of axial bins.

14. The method as recited in claim 13, wherein the azimuthal target bin and the axial target bin correspond to a matching axial position and a range of azimuths, and the computing and the calculating are performed in parallel.

15. The method as recited in claim 13, wherein the set of axial filter coefficients is equivalent to the set of azimuthal filter coefficients.

16. The method as recited in claim 13, wherein each axial position is separated by a uniform distance.

17. A system to filter measurements from a subterranean formation collected along an axis of a borehole of a well system, comprising:

a downhole tool, operable to collect the measurements;

a data filterer, operable to receive the measurements from the downhole tool and generate filtered values by applying one or more filters to the measurements using an azimuthal binning of the measurements; and a controller, operable to receive the filtered values from the data filterer and to utilize the filtered values to sharpen an image derived from the measurements by applying a deconvolution process, wherein the data filterer utilizes a set of azimuthal filter coefficients in the applying, and the set of azimuthal filter coefficients includes at least one positive filter coefficient and at least one negative filter coefficient, determining an amount of deconvolution utilizing a ratio of a sum of the at least one negative filter coefficient to a sum of the at least one positive filter coefficient, wherein the controller is one or more of a well site controller and a surface computing system.

18. The system as recited in claim 17, wherein the data filterer is further operable to use an axial binning of the measurements, an axial filter, and a set of axial filter coefficients, and the measurements are collected at two or more axial positions within the borehole.

19. The system as recited in claim 17, wherein the downhole tool is one of a nuclear measurement tool, a density tool, a gamma ray tool, an acoustic tool, a resistivity tool, a fiber optic sensor, and a distributed acoustic sensor tool.

20. The system as recited in claim 17, wherein the data filterer receives parameters from the controller, where the parameters include one or more of an azimuthal bin count, an axial bin count, and one or more sets of filter coefficients.

21. A computer program product having a series of operating instructions stored on a non-transitory computer-readable medium that directs a data processing apparatus when executed thereby to perform operations to filter measurements, from a subterranean formation, collected along an axis of a borehole of a well system, the operations comprising:

partitioning a circumference of the borehole into a set of azimuthal bins, wherein each azimuthal bin represents a range of azimuths;

defining a set of azimuthal filter coefficients including at least one positive filter coefficient and at least one negative filter coefficient;

allocating the measurements to the set of azimuthal bins using the range of azimuths corresponding with each measurement;

selecting an azimuthal target bin and a determined number of neighboring azimuthal bins from the set of azimuthal bins to form an azimuthal subset of bins;

computing a filtered value for the azimuthal target bin by applying a deconvolution process by multiplying each measurement in the azimuthal subset of bins by a corresponding azimuthal filter coefficient from the set of azimuthal filter coefficients and summing products resulting from the multiplying, and determining an amount of deconvolution utilizing a ratio of a sum of the at least one negative filter coefficient to a sum of the at least one positive filter coefficient; and repeating the selecting and the computing for each azimuthal bin in the set of azimuthal bins.

22. The computer program product as recited in claim 21, further comprising:

apportioning the borehole into a set of axial bins for each range of azimuths;

determining a set of axial filter coefficients that includes at least one positive filter coefficient and at least one negative filter coefficient;

allotting the measurements to the set of axial bins using the range of azimuths and axial position of each measurement;

choosing an axial target bin and a determined number of neighboring axial bins from the set of axial bins to form an axial subset of bins;

calculating a final filtered value for the axial target bin by multiplying the filtered value in each of the axial subset of bins by a corresponding axial filter coefficient from the set of axial filter coefficients and summing products resulting from the multiplying; and re-execute the choosing and the calculating for each axial bin in the set of axial bins.

\* \* \* \* \*